United States Patent [19]
Phung et al.

[11] Patent Number: 5,916,312
[45] Date of Patent: Jun. 29, 1999

[54] ASIC HAVING FLEXIBLE HOST CPU INTERFACE FOR ASIC ADAPTABLE FOR MULTIPLE PROCESSOR FAMILY MEMBERS

[75] Inventors: Quang C. Phung, San Jose; Moshe Bublil, Sunnyvale, both of Calif.

[73] Assignees: Sony Corporation, Tokyo, Japan; Sony Electronics, Inc., Park Ridge, N.J.

[21] Appl. No.: 08/851,695

[22] Filed: May 6, 1997

[51] Int. Cl.$^6$ .................................................. G06F 13/40
[52] U.S. Cl. ...................... 710/127; 710/126; 710/131; 710/129
[58] Field of Search ..................... 395/280, 307; 364/238; 710/126, 127, 128, 129, 131, 132

[56] References Cited

U.S. PATENT DOCUMENTS

| | | | |
|---|---|---|---|
| 4,716,527 | 12/1987 | Graciotti | 395/307 |
| 4,766,538 | 8/1988 | Miyoshi | 395/307 |
| 5,274,784 | 12/1993 | Arimilli et al. | 395/306 |
| 5,301,296 | 4/1994 | Mohri et al. | 711/128 |
| 5,471,632 | 11/1995 | Gavin et al. | 395/284 |
| 5,483,660 | 1/1996 | Yishay et al. | 395/280 |
| 5,590,287 | 12/1996 | Zeller et al. | 395/307 |
| 5,761,478 | 6/1998 | Chen et al. | 711/172 |
| 5,781,746 | 7/1998 | Fleck | 395/306 |

*Primary Examiner*—Thomas C. Lee
*Assistant Examiner*—Harold Kim
*Attorney, Agent, or Firm*—Wood,Herron&Evans, L.L.P.

[57] ABSTRACT

A CPU interface having an 8-bit mode in which the interface is capable of interfacing with a host CPU having 8-bit data bus, and a 16-bit mode in which the interface is capable of interfacing with a host CPU having a 16-bit data bus. The host CPU interface is further capable of switching between its 8-bit and 16-bit modes in real time in response to a 16-bit host CPU entering sections of 8-bit or 16-bit software. The interface also has "direct" and "indirect" addressing modes, so that the interface can send or receive time-multiplexed data, and receive address information on a single bus ("indirect" mode) or send or receive data, and receive address information in parallel on separate buses ("direct" mode).

19 Claims, 9 Drawing Sheets

ASIC HAVING FLEXIBLE HOST CPU INTERFACE FOR ASIC ADAPTABLE FOR MULTIPLE PROCESSOR FAMILY MEMBERS

FIELD OF THE INVENTION

The present invention relates to interfacing a computing circuit to a host central processing unit.

BACKGROUND OF THE INVENTION

In many applications the functionality and/or speed of a central processing unit (CPU) is increased by interfacing the CPU to a separate computing circuit. When configured in this way, the CPU acts as a "host" for the separate computing circuit, delivering commands to the computing circuit and receiving responses therefrom. Often, the separate computing circuit includes one or more application specific integrated circuits (ASICs), which perform specific tasks. An ASIC may have a relatively simple structure of discrete logic circuits, or may be a highly complex structure, including one or more programmable circuits or CPUs, as is needed to perform the functions required by the host CPU.

ASICs are costly to design and costly to manufacture in small quantities. Accordingly, it is preferable for an ASIC to be compatible with a large number of host CPUs, so the same ASIC (potentially using different software) can be used in a number of applications, avoiding the need for repeated design effort, and increasing the quantities manufactured.

One difficulty that arises from the use of an ASIC with different host CPU's, is that various CPU families use substantially different methods for retrieving and storing data. Specifically, older CPU designs typically have an 8-bit data bus, for storing or retrieving eight bits to/from memory in parallel. For increased speed, more recent CPU designs utilize a 16-bit data bus for storing or retrieving sixteen bits to/from memory in parallel. Typically, 16-bit CPUs sold by a particular manufacturer are capable of executing software written for that manufacturer's prior 8-bit CPUs. Unfortunately, an ASIC configured for use with a 16-bit CPU typically cannot interface with an 8-bit CPU, and furthermore typically cannot interface with a 16-bit CPU when the 16-bit CPU is running 8-bit software.

Some CPU families, including the R2000, R3000 and R6000 RISC CPU's sold by Silicon Graphics, access memory by time-multiplexing address and data information on a common bus. Other CPU's, such as Intel and Motorola CPU's, access memory through separate address and data buses. As a result, an ASIC configured for use with a CPU having address and data buses will be incompatible with CPU's that multiplex address and data information on a common, time-multiplexed bus.

SUMMARY OF THE INVENTION

In accordance with principles of the present invention, the above difficulties are overcome by an ASIC host CPU interface having an 8-bit mode in which the interface is capable of interfacing with 8-bit data bus CPU, and a 16-bit mode in which the interface is capable of interfacing with a 16-bit data bus. The host CPU interface is further capable of switching between its 8-bit and 16-bit modes in real time in response to a 16-bit host CPU entering sections of 8-bit or 16-bit software. Thus, the interface is not only compatible with older, 8-bit software which may be used by some 16-bit CPU's, but furthermore, the host CPU and interface can be selectively operated in an 8-bit mode for the purpose of power conservation, since in 8-bit mode only half of the circuit nodes in the host CPU and CPU interface will be active, i.e., transitioning between digital levels, as are active in a 16-bit mode.

Specifically, the interface includes a data width signal line for receiving a data width signal indicative of a width of data used by the central processing unit. A demultiplexer connected to the data input bus, stores digital signals received on the data input bus into a data register. The demultiplexer has a first mode in which the demultiplexer stores data in words of a first number of digital signals (e.g., 8 bits), and a second mode in which the demultiplexer stores data in words of a second different number of digital signals (e.g., 16 bits). Control logic controls the operation of the demultiplexer, based on the width signal received by the interface, so that words of the appropriate number of signals are stored by the demultiplexer.

In the disclosed specific embodiment of the invention, the data register is 32-bits in length, and the demultiplexer fills the data register with data by storing 8 bits words from the data input bus, or by storing 16-bit words from the data input bus, depending on the width signal received by the interface.

The interface in accordance with principles of the present invention, also has "direct" and "indirect" addressing modes, so that the interface can receive time-multiplexed data and address information on a single bus ("indirect" mode) or receive data and address information in parallel on separate buses ("direct" mode).

Specifically, the interface includes a direct/indirect signal line for receiving a direct/indirect signal indicative of whether the connected host CPU has separate address and data outputs or a multiplexed data/address output. When a "direct" mode CPU is connected to the interface, as indicated by a signal on the direct/indirect signal line, a multiplexer in the interface delivers an address received by the interface's address input bus to the ASIC circuitry. However, when an "indirect" mode CPU is connected to the interface, address information is input to the interface through the interface's data input bus, stored in an address register, and then delivered by the multiplexer to the ASIC circuitry.

In the disclosed specific embodiment, the interface includes an address demultiplexer connected to the data input bus and the address register for storing address signals received on the data input bus into the address register. To accommodate different signal widths, the address demultiplexer has a first mode in which it stores words of a first number of digital signals (e.g., 8 bits) into the address register, and a second mode in which it stores words of a second different number of digital signals (e.g., 16 bits) into the address register. The address demultiplexer is controlled by control logic connected to one or more lines of the address input bus, to the data width signal line, and to the direct/indirect signal line. (The control lines from an "indirect" mode CPU, which identify which data or address word is being output, are connected to lines of the ASIC interface's address input bus.) The control logic responds to the direct/indirect signal, data width signal, and the signals received from the address input bus, by causing the address demultiplexer to store the appropriate address byte(s) from the data input bus into the address register.

Accordingly, through principles of the present invention, an ASIC interface can accommodate CPU's with both 8- and 16-bit data widths, and can accommodate "direct" or "indirect" mode CPU's.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
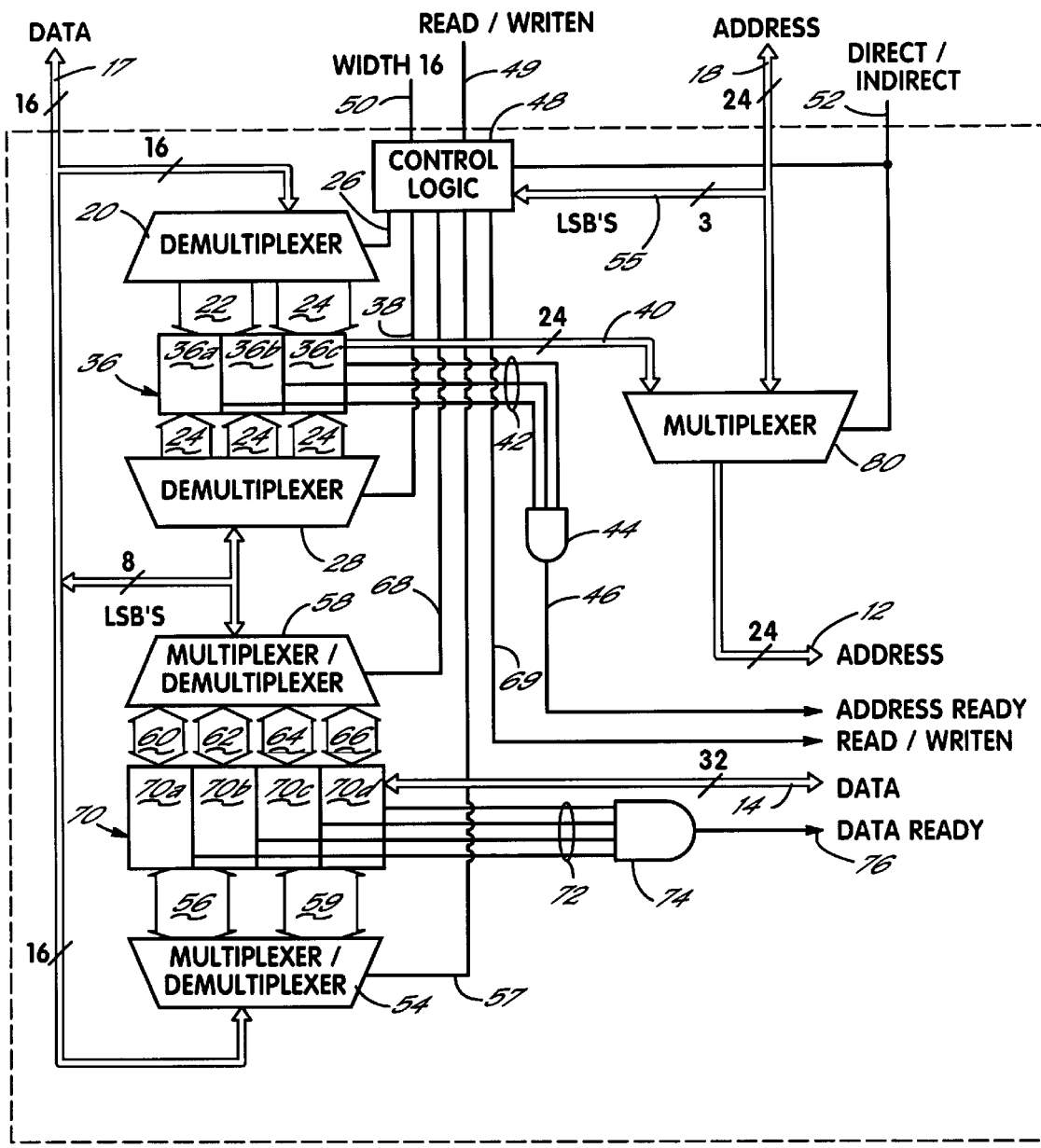
FIG. 1 shows a host interface in accordance with principles of the present invention for interacting with a data and address bus of a host CPU to deliver data and address information to internal circuitry of an ASIC.

Referring to the drawings and particularly FIG. 1 thereof, an ASIC 10 includes various processing circuitry for performing special processing functions, in response to commands, data or other digital information delivered from a host CPU. The internal structure of the ASIC 10 includes a 24-bit address bus 12 which carries binary addresses, as well as a 32-bit data bus 14.

Commands, data or other digital information are delivered to the ASIC from the host CPU, and status information, data or other digital information are returned from the ASCI to the host CPU. The host CPU views the ASIC as a memory location in the host CPU's memory space. Accordingly, the host CPU delivers data to the ASIC by writing to a memory location assigned to the ASIC. The host CPU reads data from the ASIC by reading from a memory location assigned to the ASIC.

As will be described in substantially greater detail below, ASIC 10 includes sixteen data input/output lines 17 and twenty-four address input lines 18, which can be connected in various ways to various forms of host CPU, to allow the host CPU to address the ASIC in the above manner.

Data input lines 17 are connected to a 16-bit address demultiplexer 20, having a first 16-bit output on lines 22 and a second 8-bit output on lines 24. Demultiplexer 20 delivers the sixteen digital signals (constituting the less significant portion of a 24-bit address) received at input lines 17 to its sixteen output lines 22, or delivers eight digital signals (constituting the most significant portion of a 24-bit address) received at input lines 17 to the eight output lines 24, under control of control signals received by demultiplexer 20 over lines 26.

The eight least significant data input lines 17 are also connected to a second address demultiplexer 28, which has three 8-bit outputs 30, 32 and 34. Demultiplexer 28 delivers the eight digital signals received from input lines 17 to its eight output lines 30, or its eight output lines 32, or its eight output lines 34 under control of control signals received by demultiplexer 28 over lines 38.

Output lines 22 and 24 of the first address demultiplexer 20 are connected to a 24 bit address register 36. Also, output lines 30, 32 and 34 of the second address demultiplexer 28 are connected to address register 36. Address register 36 stores digital data received from lines 22 or 24, or lines 30, 32 and 34, to accumulate a 24-bit address. Address register 36 delivers the assembled 24-bit address on a 24-bit bus 40.

Address register 36 is divided into three 8-bit sections 36a, 36b and 36c. Each section may separately receive data from one of lines 22 and 24, or lines 30, 32 and 34. Each section 36a, 36b and 36c produces a signal on one of three lines 42, to indicate that valid data has been stored in that section. The three lines 42 are input to a three-input AND gate 44, which produces at its output an ADDRESS READY signal on line 46 indicating that a complete 24-bit address has been received by address register 36 and is ready for output over bus 40.

Data input lines 17 are also connected to a 16-bit data multiplexer/demultiplexer 54, having a 16-bit input/output connected to lines 17, first 16-bit output/input on lines 56 and a second 16-bit output/input on lines 59. When used in writing data to ASIC 10, multiplexer/demultiplexer 54 delivers sixteen digital signals received at lines 17 to lines 56 or lines 59, under control of control signals received by multiplexer/demultiplexer 54 over lines 57. When used in reading data from ASIC 10, multiplexer/demultiplexer 54 delivers sixteen digital signals received from lines 56 or lines 59, to lines 17, under control of control signals received by multiplexer/demultiplexer 54 over lines 57.

The eight least significant data lines 17 are also connected to a second data multiplexer/demultiplexer 58, which has an input/output connected to the eight least significant data lines 17, and four 8-bit output/inputs connected to lines 60, 62, 64 and 66. When used in writing data to ASIC 10, multiplexer/demultiplexer 58 delivers the eight digital signals received from lines 17 to lines 60, or lines 62, or its lines 64, or lines 66, under control of control signals received by multiplexer/demultiplexer 58 over lines 68. When used in reading data from ASIC 10, multiplexer/demultiplexer 58 delivers the eight digital signals received from lines 60, or lines 62, or its lines 64, or lines 66, to lines 17, under control of control signals received by multiplexer/demultiplexer 58 over lines 68.

Lines 56 and 59 connecting to the first data multiplexer/demultiplexer 54 are connected to a 32-bit data register 70. Also, lines 60, 62, 64 and 66 connected to the second data multiplexer/demultiplexer 58 are connected to data register 70. When used in writing data to the ASIC 10, data register 70 stores digital data received from lines 56 and 59, or lines 60, 62, 64 and 66, to accumulate a 32-bit data word. Data register 70 delivers the assembled 32-bit data word on the 32-bit data bus 14. When used in reading data from the ASIC 10, data register 70 receives an assembled 32-bit data word from the 32-bit data bus 14, and stores the 32-bit data word for delivery in 16- or 8-bit sections via lines 56 and 59, or lines 60, 62, 64 and 66.

Data register 70 is divided into four 8-bit sections 70a, 70b, 70c and 70d. Each section may separately receive or deliver data from or to one of lines 56 and 59, or lines 60, 62, 64 and 66. Each section 70a, 70b, 70c and 70d produces a signal on one of four lines 72, to indicate that valid data has been stored in that section. The four lines 72 are input to a four-input AND gate 74, which produces at its output a DATA READY signal on line 76 indicating that a complete 32-bit data word has been received by data register 70 and is ready for delivery to the ASIC over bus 14.

The first and second address demultiplexers 20 and 28, and the first and second data multiplexer/demultiplexers 54 and 58, are respectively controlled by control signals on lines 26, 38, 57 and 68 produced by control logic 48. Control logic 48 causes demultiplexers 20 and 28 to receive address signals when an "indirect" mode host CPU is used with ASIC 10. Furthermore, control logic 48 causes demultiplexer 20 to receive address signals in 16-bit words, and causes multiplexer/demultiplexer 54 to send and receive data signals in 16-bit words when the host CPU is a 16-bit CPU running 16-bit software. Alternatively, control logic 48 causes demultiplexers 28 to receive address signals in 8-bit words, and causes multiplexer/demultiplexer 58 to send and receive data signals in 8-bit words when the host CPU is an 8-bit CPU or a 16-bit CPU running 8-bit software. Control logic 48 further generates a read/writeN signal on line 69 for delivery to the ASIC 10 to indicate whether data is to be read or written.

To facilitate these functions, control logic 48 is responsive to a read/writeN signal on line 49, a WIDTH 16 signal on line 50, a direct/indirect signal on line 52, and to the three least significant lines 55 of the address input bus 18. The interaction of control logic 48 with these various inputs to control demultiplexers 20 and 28 and multiplexer/demultiplexers 54 and 58 will be discussed in further detail below in connection with FIGS. 2A–5C.

FIG. 1 illustrates the 24-bit address input bus 18 which may be used in some environments to deliver address information to the ASIC 10. As noted above, the three least significant lines of the address input bus 18 are connected to control logic 48. Further, all of the lines of the address input bus 18 connect to a 24-bit multiplexer 80. Multiplexer 80 receives, at a second input, the 24-bit output of address register 36 on lines 40. Multiplexer 80 delivers either the 24-bit signal received from address input bus 18, or the 24-bit signal received from address register 36 on lines 40, to the 24-bit address bus 12 of the ASIC. Multiplexer 80 is responsive to the DIRECT/INDIRECT signal on line 52, so that when the ASIC 10 is in "direct" mode, multiplexer 80 delivers the 24-bit signal received from the address input bus 18 directly to address bus 12 of the ASIC, whereas when the ASIC 10 is in "indirect" mode, multiplexer 80 delivers the 24-bit signal received on lines 40 to address bus 12 of the ASIC.

To explain the functions of control logic 48 with particularity, the inter-operation of ASIC 10 with four categories of host CPU will now be explained. The four categories of host CPU are summarized in the following table, along with a general indication of the manner in which these various kinds of host CPUs are connected to the data bus 17 and address input bus 18 of the ASIC 10:

| Host CPU Configuration | Connections to ASIC Data Bus Input/Output 17 | Connections to ASIC Address Bus Input 18 |
| --- | --- | --- |
| 8-bit data bus, separate address bus | 8-bit data bus of host CPU connected to eight least significant bits of ASIC data bus input/output 17. | Address bus of host CPU connected to address bus input of ASIC.* |
| 16-bit data bus, separate address bus | 16-bit data bus of host CPU connected to 16-bit ASIC data bus input/output 17. | Address bus of host CPU connected to address bus input of ASIC.* |
| 8-bit time-multiplexed data/address bus | 8-bit data/address bus of host CPU connected to eight least significant bits of ASIC data bus input/output 17. | Data/address word bits connected to three least significant bits of ASIC address bus input. |
| 16-bit time-multiplexed data/address bus | 16-bit data/address bus of host CPU connected to 16-bit ASIC data bus input/output 17. | Data/address word bits connected to two least significant bits of ASIC address bus input. |

*If the address space of the host CPU is less than 24 bits wide, the address bus of the host CPU is connected to the least significant bits of the ASIC address bus input.

Figure 2A:
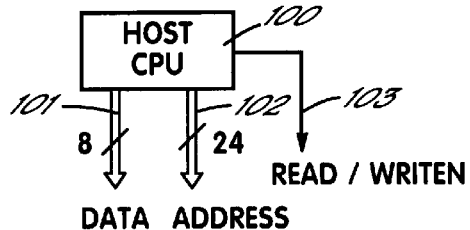
FIG. 2A is a diagram showing the data and address lines of an 8-bit, "direct" mode host CPU.

Referring to FIG. 2A, the first category of host CPU to be discussed is an 8-bit host CPU 100 having an 8-bit data bus 101 and a 24-bit address bus 102. CPU 100 further produces a read/writeN signal on line 103 indicating whether CPU 100 is reading or writing a memory location.

A host CPU of this kind is connected to the ASIC by connecting the 8-bit data bus 101 of the host CPU 100 to the eight least-significant lines of the ASIC data input bus 17, and connecting the twenty-four address lines of the host CPU address bus 102 to the twenty-four lines of the ASIC address input bus 18. The read/writeN output 103 of the CPU is connected to the read/writeN input 49 of ASIC 10. At the same time, the WIDTH16 input line 50 of the ASIC 10 is hard-wired to a "0" (false) logic value to permanently place the ASIC 10 in an 8-bit operating mode, and the "DIRECT/INDIRECT" input line 52 of the ASIC 10 is hard-wired to a "DIRECT" state to indicate that the connected CPU has separate address and data buses.

Figure 2B:
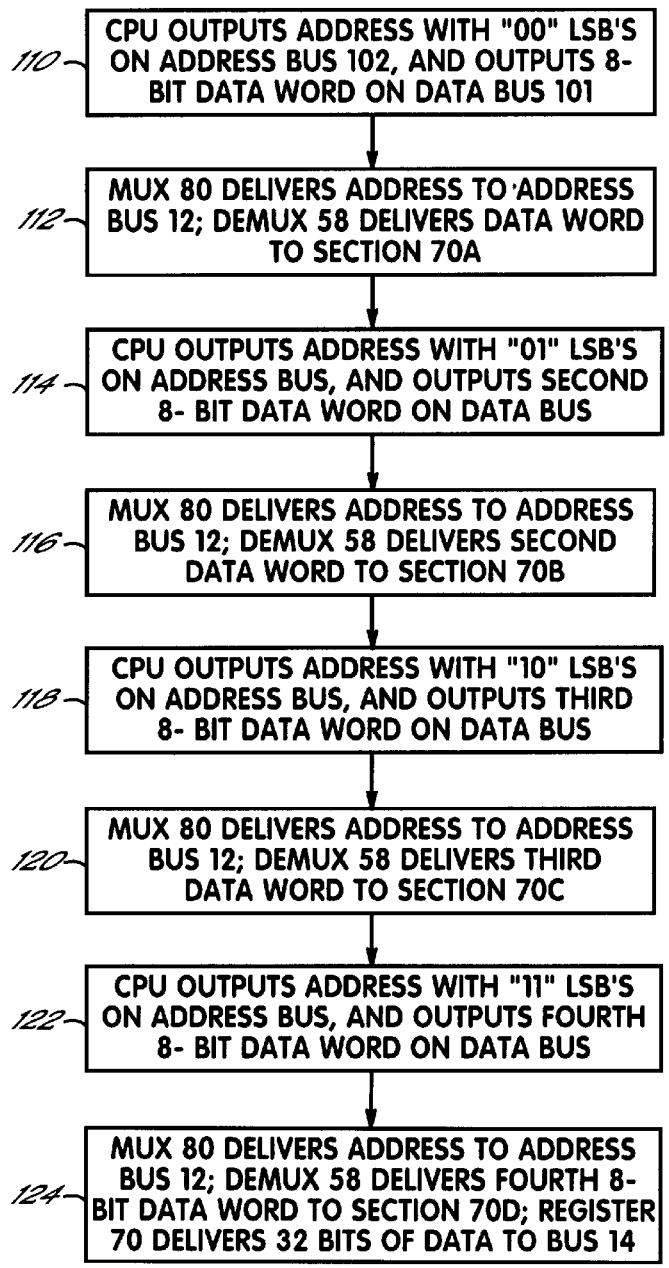
FIG. 2B is a flow chart of operations performed by such a CPU and by the ASIC host interface of FIG. 1 in delivering an address and data to a memory location in the ASIC.

As seen in FIG. 2B, the CPU of FIG. 2A delivers data to a location in the ASIC in 8-bit words, with each word separately addressed. Specifically, CPU 100 writes 32-bits of data to the ASIC by sequentially writing four consecutive 8-bit words to the ASIC. Throughout this process, since data is being delivered to a location in ASIC 10, the read/writeN signal on lines 103 and 49 has a "0" (write) value, and in response, control logic 48 produces a read/writeN signal on line 69 having a "0" (write) value. In step 110, CPU 100 first outputs on bus 102, the address of the first data word, which address has least significant bits (LSBs) of "00", and simultaneously delivers the 8-bit data word to be stored at that address over data bus 101. (The 22 most significant bits of the address identify the specific register in ASIC 10 to which data is being written.) Next, in step 114, CPU 100 outputs on address bus 102, the consecutively next higher address on bus 102, having LSBs of "01", while delivering the next 8-bit data word over data bus 101. Next, in step 118, CPU 100 outputs on address bus 102, the consecutively next higher address on bus 102, having LSBs of "10", while delivering the next 8-bit data word over data bus 101. Finally, in step 122, CPU 100 outputs on address bus 102, the consecutively next higher address on bus 102, having LSBs of "11", while delivering the last of four 8-bit data words over data bus 101.

Control logic 48 determines that an 8-bit, direct mode CPU 100 is connected to the ASIC, from the "0" (false) value of the WIDTH16 signal on line 50 and the "direct" value of the DIRECT/INDIRECT signal on line 52. As can be seen in the flow chart of FIG. 2B, control logic 48 causes the ASIC to respond to the CPU 100 by appropriately storing the data received from the CPU 100.

Specifically, as a result of "direct" signal value on line 52, control logic 48 causes multiplexer 80 to deliver the address bits received on bus 18 directly to address bus 12 (see steps 112, 116, 120 and 124). At the same time, control logic 48 responds to LSB's received from the address bus 18 to store 8-bit data words received from CPU 100, in the appropriate location in data register 70. In step 112, control logic 48 responds to the "00" value of the LSB's on address bus 102, to cause the multiplexer/demultiplexer 58 to deliver the 8-bit data word on the LSB's of bus 17 to section 70a of data register 70. Next, in step 116, control logic 48 responds to the "01" value of the LSB's on address bus 102, to cause the multiplexer/demultiplexer 58 to deliver the 8-bit data word on the LSB's of bus 17 to section 70b of data register 70. Next, in step 120, control logic 48 responds to the "10" value of the LSB's on address bus 102, to cause the multiplexer/demultiplexer 58 to deliver an 8-bit data word on the LSB's of bus 17 to section 70c of data register 70. Finally, in step 124, control logic 48 responds to the "11" value of the LSB's on address bus 102, to cause the multiplexer/demultiplexer 58 to deliver an 8-bit data word on the LSB's of bus 17 to section 70d of data register 70. At this point, a 32-bit word of data has been accumulated in register 70, and as a result, the "DATA READY" signal is asserted on line 76. This causes the ASIC to read the 32-bit data word from register 70 through the data bus 14.

Figure 2C:
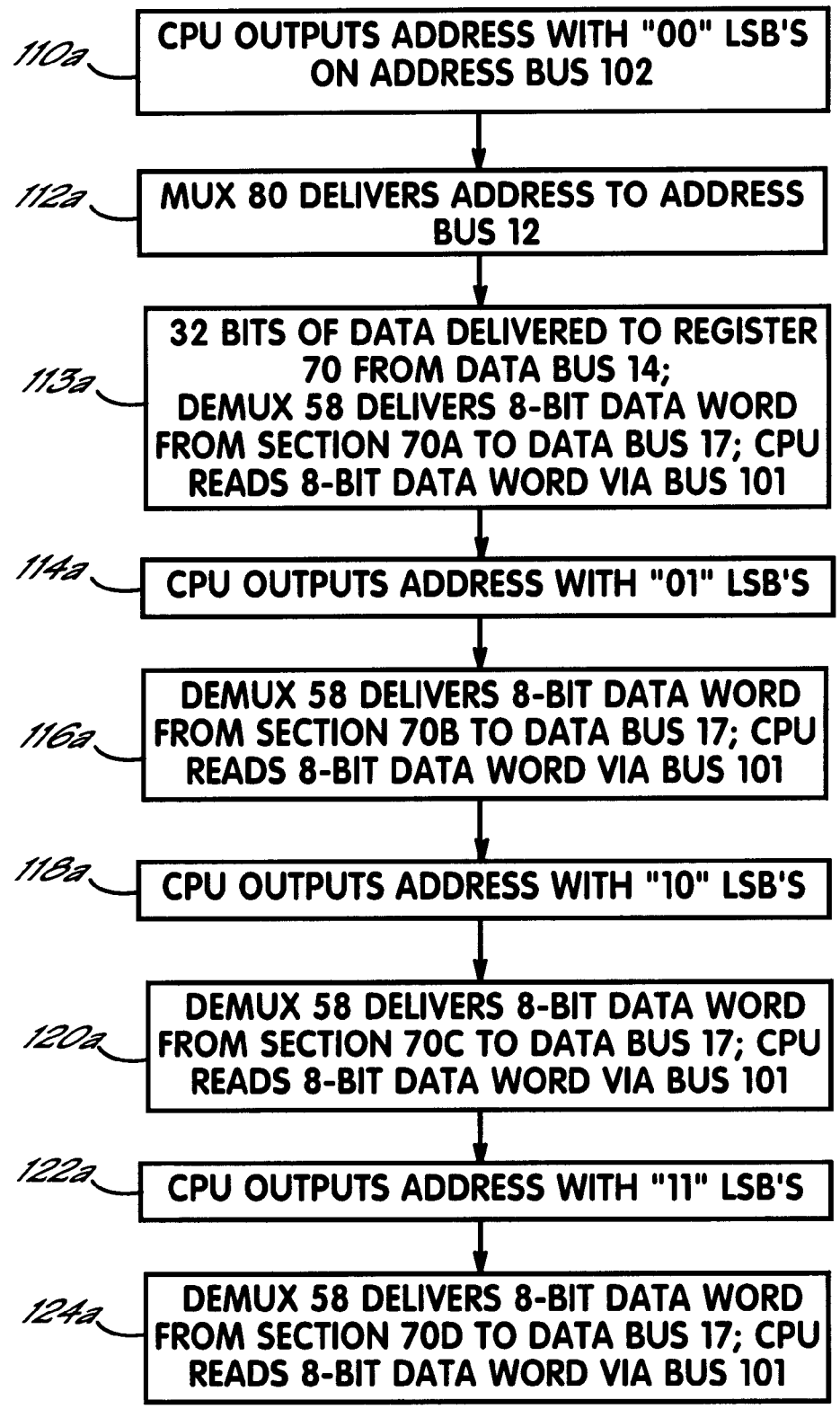
FIG. 2C is a flow chart of operations performed by such a CPU and by the ASIC host interface of FIG. 1 in retrieving data from a memory location in the ASIC.

As seen in FIG. 2C, the CPU of FIG. 2A may also retrieve data from a location in the ASIC in 8-bit words, with each word separately addressed. Specifically, CPU 100 retrieves 32-bits of data from the ASIC by sequentially reading four consecutive 8-bit words from the ASIC. Throughout this process, because data is being read from the ASIC, the read/writeN signal on lines 103 and 49 has a "1" (read) value, and in response, control logic 48 produces a read/writeN signal on line 69 having a "1" (read) value. In step 110a, CPU 100 first outputs on bus 102, the address of the first data word, which address has least significant bits (LSBs) of "00". (The 22 most significant bits of the address identify the specific register in ASIC 10 from which data is being read.) In response, in step 112a, multiplexer 80 delivers the address obtained from bus 18 to bus 12 of the ASIC 10. Then, in step 113a, ASIC 10, responding to the address delivered over bus 12, delivers 325 bits of data to register 70 over data bus 14. In the same step, multiplexer/demultiplexer 58 delivers an 8-bit data word from section 70a of register 70 to data bus 17. CPU 100 then reads this 8-bit data word from bus 101 (connected to the least significant bits of bus 17). Next, in step 114a, CPU 100 outputs on address bus 102, the consecutively next higher address on bus 102, having LSBs of "01". In response, in step 116a, multiplexer/demultiplexer 58 delivers an 8-bit data word from section 70b of register 70 to data bus 17. CPU 100 then reads this 8-bit data word from bus 101. Next, in step 118a, CPU 100 outputs on address bus 102, the consecutively next higher address on bus 102, having LSBs of "10". In response, in step 120a, multiplexer/demultiplexer 58 delivers an 8-bit data word from section 70c of register 70 to data bus 17. CPU 100 then reads this 8-bit data word from bus 101. Finally, in step 122a, CPU 100 outputs on address bus 102, the consecutively next higher address on bus 102, having LSBs of "11". In response, in step 124a, multiplexer/demultiplexer 58 delivers an 8-bit data word from section 70d of register 70 to data bus 17. CPU 100 then reads this 8-bit data word from bus 101.

Figure 3A:
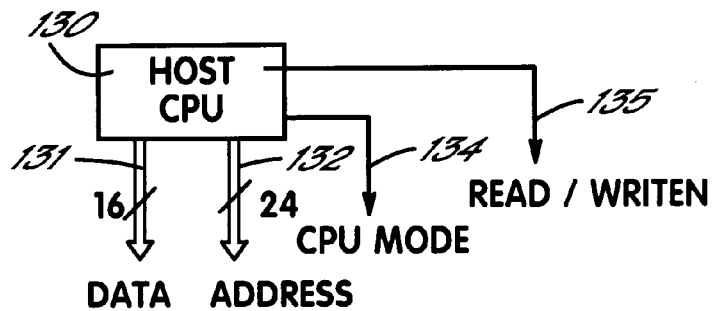
FIG. 3A is diagram showing the data and address lines of a 16-bit, "direct" mode host CPU.

Referring to FIG. 3A, the second category of host CPU is a 16-bit host CPU 130 having a 16-bit data bus 131 and a 24-bit address bus 132. The host CPU further produces a "CPU Mode" signal on a line 134, indicating whether the CPU is operating under control of 8-bit software or 16-bit software. A "0" value of the "CPU Mode" signal indicates that CPU 130 is operating under control of 8-bit software, whereas a "1" value of the "CPU Mode" signal indicates that CPU 130 is operating under control of 16-bit software. CPU 130 may, from time to time, switch from a 16-bit operating mode to an 8-bit operating mode, and vice-versa, depending on the programming supplied to CPU 130. CPU 130 further produces a read/writeN signal on a line 135.

A host CPU of this kind is connected to the ASIC by connecting the 16-bit data bus 131 of the host CPU 130 to the ASIC data input bus 17, connecting the twenty-four address lines of the host CPU address bus 132 to the twenty-four lines of the ASIC address input bus 18, and connecting the "CPU Mode" signal line 134 to the "Width 16" input line 50 of the ASIC. The read/writeN output 135 of the CPU is connected to the read/writeN input 49 of ASIC 10. At the same time, the "DIRECT/INDIRECT" input line 52 of the ASIC is hard-wired to a "DIRECT" state to indicate that the connected CPU 130 has separate address and data buses.

It will be appreciated that, when the CPU 130 shown in FIG. 3A operates under control of 8-bit software, in which case the "CPU Mode" signal on line 134 has a "0" value, the operation of the CPU and the corresponding operation of the ASIC will be identical to the operations performed when an 8-bit CPU 100 is connected to the ASIC, as discussed above in connection with FIGS. 2A through 2C. Accordingly, in the following, the operation of CPU 130 and the ASIC will be described on the assumption that CPU 130 is operating under the control of 16-bit software, and the "CPU Mode" signal on line 134 is set to a "1" value.

Figure 3B:
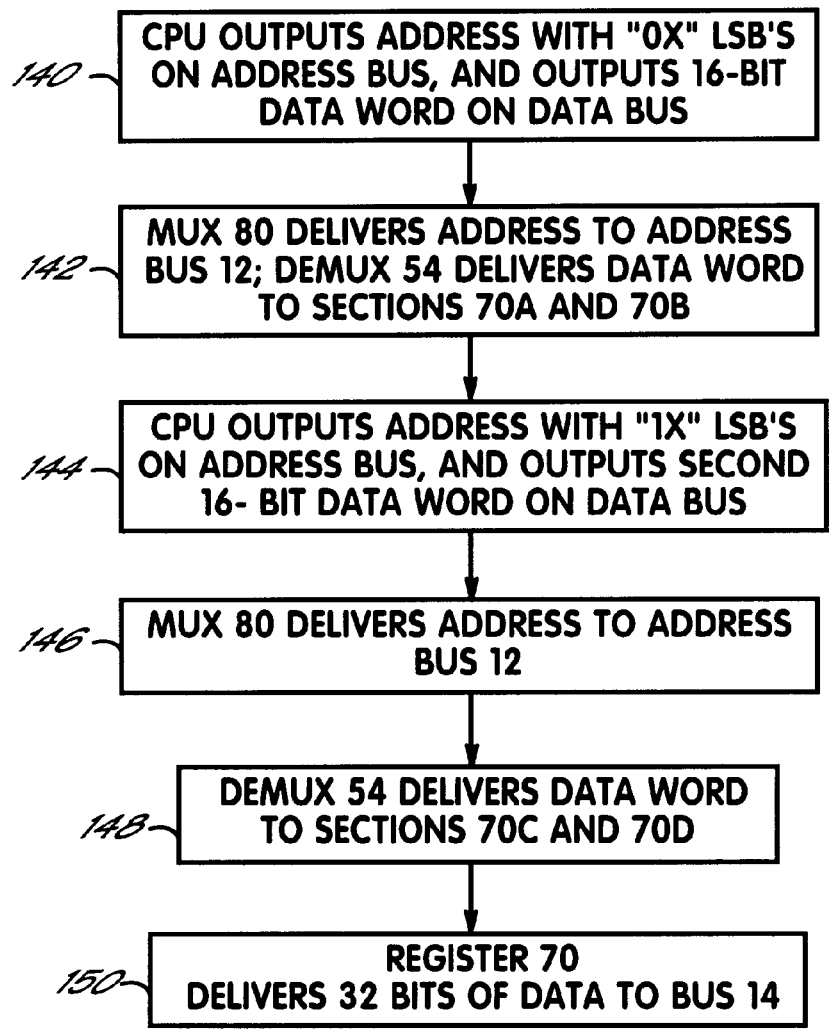
FIG. 3B is a flow chart of operations performed by such a CPU and by the ASIC host interface of FIG. 1 in delivering an address and data to a memory location in the ASIC.

Referring to FIG. 3B, under the above conditions, CPU 130 writes 32-bit words of data to the ASIC by sequentially writing two consecutive 16-bit words to the ASIC. Throughout this process, since data is being delivered to a location in ASIC 10, the read/writeN signal on lines 135 and 49 has a "0" (write) value, and in response, control logic 48 produces a read/writeN signal on line 69 having a "0" (write) value. In step 140, CPU 130 outputs an address on bus 132 having least significant bits of "0" (where "x" indicates either a "0" or "1"), and simultaneously outputs a 16-bit data word to be stored at that address over data bus 131. The 22 most significant bits of the address indicates the location in the ASIC to which the data should be stored. Next, in step 144, CPU 130 outputs on address bus 132, the consecutively next higher address on bus 132, having LSBs of "1x", while delivering the next 16-bit data word over data bus 131.

Control logic 48 determines that a 16-bit, direct mode CPU 130 is connected to the ASIC, from the "1" (true) value of the WIDTH16 signal on line 50 and the "direct" value of the DIRECT/INDIRECT signal on line 52. As can be seen in the flow chart of FIG. 3B, control logic 48 causes the ASIC to respond to the CPU 130 by appropriately storing the data received from the CPU 130.

Specifically, control logic 48 responds to LSB's received from the address bus 18 to store 16-bit data words received from CPU 130, in the appropriate location in data register 70. In step 142, control logic 48 responds to the "0x" value of the LSB's on address bus 132, to cause the multiplexer/demultiplexer 54 to deliver the 16-bit data word on bus 17 to sections 70*a* and 70*b* of data register 70. In step 148, control logic 48 responds to the "1x" value of the LSB's on address bus 132, to cause the multiplexer/demultiplexer 54 to deliver the 16-bit data word on the LSB's of bus 17 to sections 70*c* and 70*d* of data register 70. At this point, a 32-bit word of data has been accumulated in register 70, and as a result, the "DATA READY" signal is asserted on line 76. This causes the ASIC to read the 32-bit data word from register 70 through the data bus 14 (step 150).

Figure 3C:
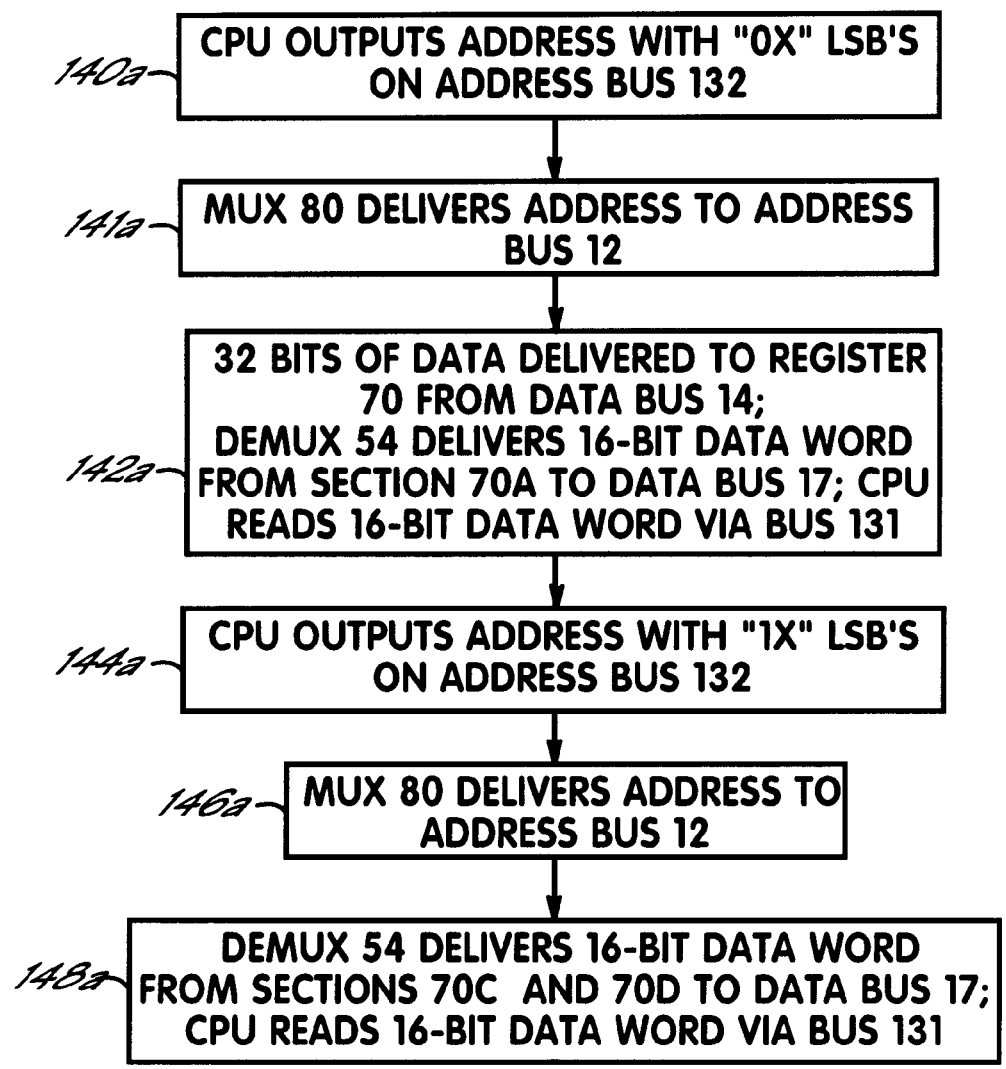
FIG. 3C is a flow chart of operations performed by such a CPU and by the ASIC host interface of FIG. 1 in retrieving data from a memory location in the ASIC.

Referring to FIG. 3C, CPU 130 reads 32-bit words of data from the ASIC by sequentially reading two consecutive 16-bit words from the ASIC. Throughout this process, since data is being read from a location in ASIC 10, the read/writeN signal on lines 135 and 49 has a "1" (read) value, and in response, control logic 48 produces a read/writeN signal on line 69 having a "1" (read) value. In step 140*a*, CPU 130 outputs an address on bus 132 having least significant bits of "0x" (where "x" indicates either a "0" or "1"). The 22 most significant bits of the address indicates the location in the ASIC from which the data should be read. In response, in step 141*a*, multiplexer 80 delivers the address from bus 18 to bus 12 for delivery to the ASIC. In response, the ASIC accesses the addressed location, and in step 142*a*, 32-bits of data are delivered to register 70 from the ASIC over data bus 14. In the same step, multiplexer/demultiplexer 54 delivers the 16-bit data word from sections 70*a* and 70*b* of register 70, to data bus 17. CPU 130 then responds by reading the 16-bit data word through its data bus 131. Next, in step 144*a*, CPU 130 outputs on address bus 132, the consecutively next higher address on bus 132, having LSBs of "1x". In response, in step 146*a*, multiplexer 80 delivers the address from bus 18 to bus 12 for delivery to the ASIC. Also, in step 148*a*, multiplexer/demultiplexer 54 delivers the 16-bit data word from sections 70*c* and 70*d* of register 70, to data bus 17. CPU 130 then responds by reading the 16-bit data word through its data bus 131.

Figure 4A:
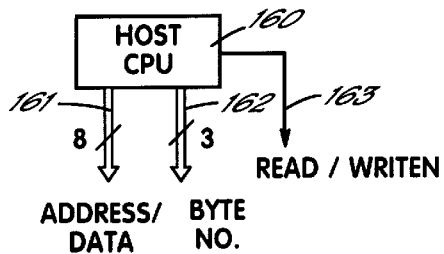
FIG. 4A is a diagram showing the data/address lines of an 8-bit, "indirect" mode host CPU.

Referring to FIG. 4A, the third category of host CPU is an 8-bit host CPU 160 having an 8-bit multiplexed data/address bus 161, and a three-bit "Byte No." output on lines 162, as well as a read/writeN signal output on line 163. This host CPU 160 produces a "Byte No." signal on lines 162 indicative of whether address or data signals are being delivered over bus 161, so that the external hardware may distinguish address and data signals and respond appropriately. Specifically, "Byte No." values of "000", "001" and "010" indicate that the first, second and third bytes of the address, respectively, are being delivered over data/address bus 161. Further, "Byte No." values of "011", "100", "101" and "110" indicate that the first, second, third and fourth bytes of a 32-bit data word, respectively, are being sent or received over data/address bus 161. Accordingly, by demultiplexing the address, and demultiplexing or demultiplexing data words on data/address bus 161 in response to the "Byte No." signals, it is possible to interface CPU 160 to appropriate memory locations.

A host CPU of this kind is connected to the ASIC by connecting the 8-bit data/address bus 161 of the host CPU 160 to the eight least significant bits of the ASIC data input bus 17, and connecting the three lines 162 carrying the "Byte No." signals to the three least significant bits of the address input bus 18. The read/writeN output 163 of the CPU is connected to the read/writeN input 49 of ASIC 10. At the same time, the "Width 16" input line 50 of the ASIC is hard-wired to a "0" (false) value, indicating that the CPU 160 is an 8-bit CPU, and the "DIRECT/INDIRECT" input line 52 of the ASIC is hard-wired to an "INDIRECT" state to indicate that the connected CPU 160 multiplexes addresses and data over a common bus.

Figure 4B:
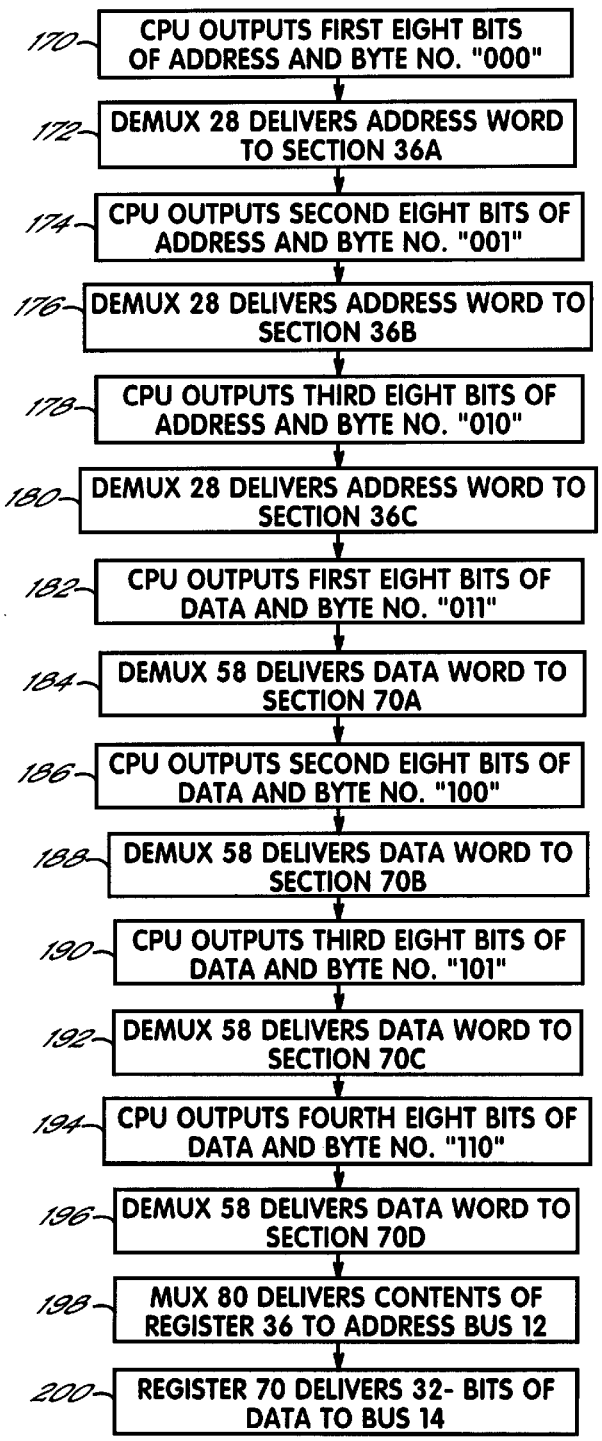
FIG. 4B is a flow chart of operations performed by such a CPU and by the ASIC host interface of FIG. 1 in delivering an address and data to a memory location in the ASIC.

As seen in FIG. 4B, the CPU of FIG. 4A delivers data and addresses as multiple 8-bit bytes. Specifically, whether reading or writing data, in step 170, CPU 160 outputs the first 8-bit byte of the address over bus 161, while delivering a "Byte No." signal of "000" over lines 162. Next, in step 174, CPU 160 outputs the second 8-bit byte of the address over bus 161, while delivering a "Byte No." signal of "001" over lines 162. Finally, in step 178, CPU 160 outputs the third 8-bit byte of the address over bus 161, while delivering a "Byte No." signal of "010" over lines 162.

As a result of the "indirect" signal on line 52, control logic 48 causes demultiplexer 28 to collect bytes of the address received on bus 17 into address register 36, and also causes multiplexer 80 to deliver the digital signals in the output of address register 36 to the address bus 12 of the ASIC. Specifically, in step 172, control logic 48 responds to the "000" value of the "Byte No." signal on the LSB's of address input bus 18, by causing demultiplexer 28 to deliver the first 8-bit byte of the address to section 36*a* of address register 36. In step 176, control logic 48 responds to the "001" value of the "Byte No." signal, by causing demultiplexer 28 to deliver the second 8-bit byte of the address to section 36*b* of address register 36. Finally, in step 180, control logic 48 responds to the "010" value of the "Byte No." signal, by causing demultiplexer 28 to deliver the third 8-bit byte of the address to section 36*c* of address register 36. At this point, register 36 has been filled with 24-bits of address, and as a consequence the "ADDRESS READY" signal is asserted on line 46. The ASIC can thereafter read the address delivered into register 36 through multiplexer 80.

After delivering an address in the above manner, if CPU 160 is writing data to a location in the ASIC, CPU 160 delivers data to the ASIC in 8-bit words. Specifically, CPU 160 writes 32-bits of data to the ASIC by sequentially writing four consecutive 8-bit words to the ASIC. Throughout this process, since data is being written to a location in ASIC 10, the read/writeN signal on lines 163 and 49 has a "0" (write) value, and in response, control logic 48 produces a read/writeN signal on line 69 having a "0" (write) value. In step 182, CPU 160 first outputs on bus 161, the first 8-bit data word, and simultaneously delivers a "Byte No." signal of "011" on lines 162. Next, in step 186, CPU 160 outputs on bus 161, the next 8-bit data word, while simultaneously delivering a "Byte No." signal of "100" on lines 162. Next in step 190, CPU 160 outputs on bus 161, next 8-bit data word, while simultaneously delivering a "Byte No." signal of "101" on lines 162. Finally, in step 194, CPU 160 outputs on bus 161 the last of four 8-bit data words, while simultaneously delivering a "Byte No." signal of "110" on lines 162.

Control logic 48 responds to the "Byte No." signals received from the ASIC address bus 18 to store 8-bit data words received from CPU 160, in the appropriate location in data register 70. In step 184, control logic 48 responds to the "011" value of the "Byte No." signal, to cause the demultiplexer 58 to deliver the 8-bit data word on the LSB's of bus 17 to section 70*a* of data register 70. Next, in step 188, control logic 48 responds to the "100" value of the "Byte No." signal, to cause the demultiplexer 58 to deliver the 8-bit data word on the LSB's of bus 17 to section 70*b* of data register 70. Next, in step 192, control logic 48 responds to the "101" value of the "Byte No." signal, to cause the demultiplexer 58 to deliver the 8-bit data word on the LSB's of bus 17 to section 70c of data register 70. Finally, in step 196, control logic 48 responds to the "010" value of the "Byte No." signal, to cause the demultiplexer 58 to deliver an 8-bit data word on the LSB's of bus 17 to section 70d of data register 70. At this point, a 32-bit word of data has been accumulated in register 70, and as a result, the "DATA READY" signal is asserted on line 76. This causes the ASIC to read the 32-bit data word from register 70 through the data bus 14 (step 200).

Figure 4C:
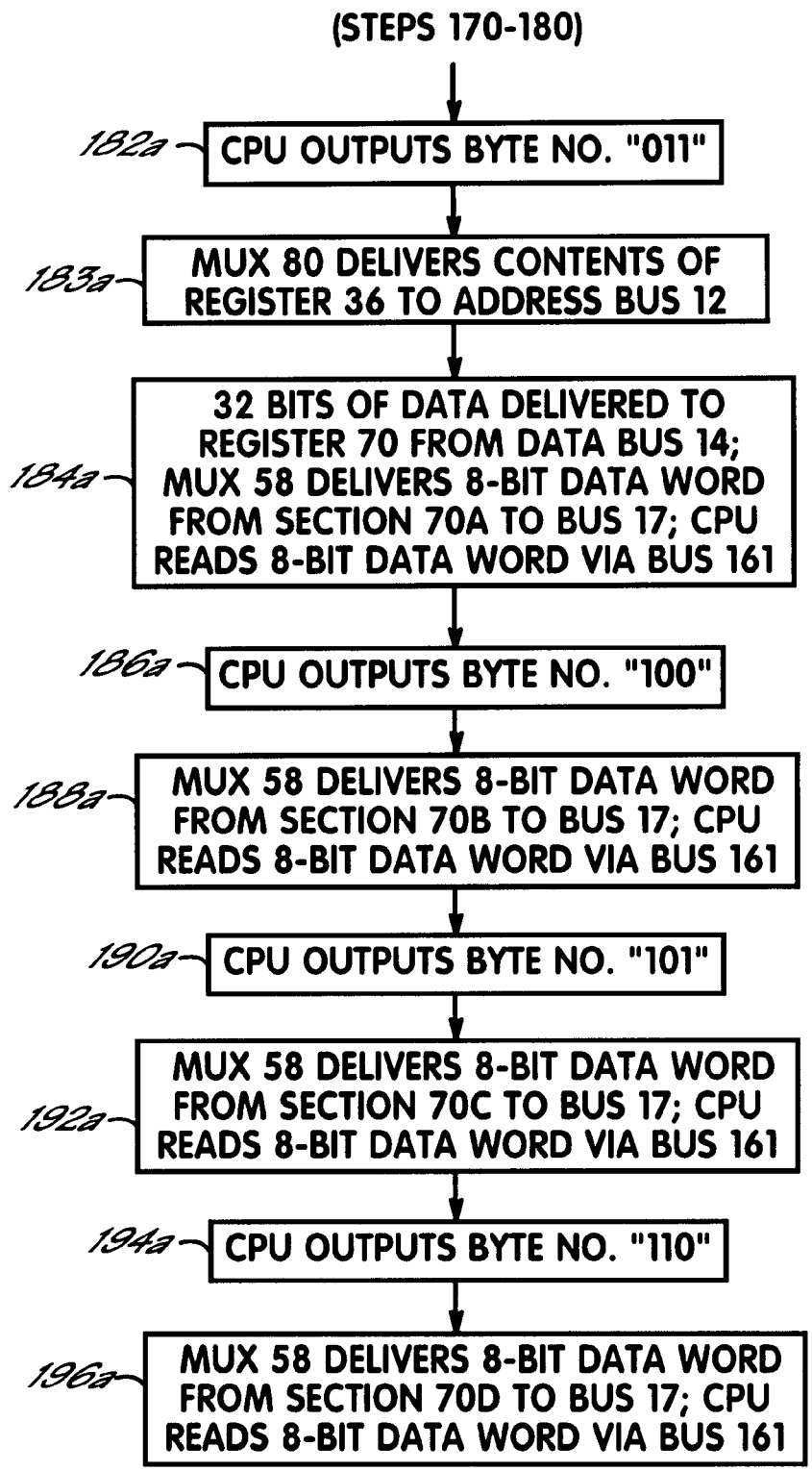
FIG. 4C is a flow chart of operations performed by such a CPU and by the ASIC host interface of FIG. 1 in retrieving data from a memory location in the ASIC.

Referring to FIG. 4C, after delivering an address in the above manner through steps 170–180, if CPU 160 is reading data from a location in the ASIC, CPU 160 reads the data from the ASIC in 8-bit words. Specifically, CPU 160 reads 32-bits of data from the ASIC by sequentially reading four consecutive 8-bit words from the ASIC. Throughout this process, since data is being read from a location in ASIC 10, the read/writeN signal on lines 163 and 49 has a "1" (read) value, and in response, control logic 48 produces a read/writeN signal on line 69 having a "1" (read) value. To read the bytes in sequence, in step 182a, CPU 160 delivers a "Byte No." signal of "011" on lines 162. In response, multiplexer 80 delivers the contents of register 36 to address bus 12, triggering the ASIC to read the addressed register therein. Then, in step 184a, the ASIC responds by delivering 32-bits of data to register 70 from data bus 14. In the same step, multiplexer/demultiplexer 58 (which is used as a multiplexer) delivers a first 8-bit word of data from section 70a of register 70 to bus 17, and the CPU 160 reads this 8-bit data word via its bus 161. Next, in step 186a, CPU 160 delivers a "Byte No." signal of "100" on lines 162. In response, in step 188a, multiplexer 58 delivers an 8-bit word of data from section 70b of register 70 to bus 17, and the CPU 160 reads this 8-bit data word via its bus 161. Next, in step 190a, CPU 160 delivers a "Byte No." signal of "101" on lines 162. In response, in step 192a, multiplexer 58 delivers an 8-bit word of data from section 70c of register 70 to bus 17, and the CPU 160 reads this 8-bit data word via its bus 161. Finally, in step 194a, CPU 160 delivers a "Byte No." signal of "110" on lines 162. In response, in step 196a, multiplexer 58 delivers a last 8-bit word of data from section 70d of register 70 to bus 17, and the CPU 160 reads this 8-bit data word via its bus 161.

Figure 5A:
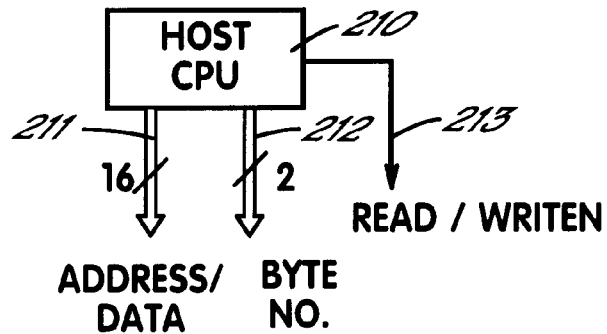
FIG. 5A is a diagram showing the data/address lines of an 16-bit, "indirect" mode host CPU.

Referring to FIG. 5A, the fourth category of host CPU is a 16-bit host CPU 210 having a 16-bit multiplexed data/address bus 211, and a two-bit "Byte No." output on lines 212, as well as a read/writeN signal output on line 213. This host CPU 210 produces a "Byte No." signal on lines 212 indicative of whether address signals are being delivered, or data signals are being delivered or received over bus 211, so that the external hardware may distinguish address and data signals and respond appropriately. Specifically, "Byte No." values of "00" and "01" indicate that the first and second portions of the address, respectively, are being delivered over data/address bus 211. Further, "Byte No." values of "10", "11" indicate that first and second portions of a 32-bit data word, respectively, are being read or written over data/address bus 211. Accordingly, by demultiplexing the address and multiplexing or demultiplexing data words on data/address bus 211 in response to the "Byte No." signals, it is possible to interface CPU 210 to appropriate memory locations.

A host CPU of this kind is connected to the ASIC by connecting the 16-bit data/address bus 211 of the host CPU 210 to the ASIC data input bus 17, and connecting the two lines 212 carrying the "Byte No." signals to the two least significant bits of the address input bus 18. The read/writeN output 213 of the CPU is connected to the read/writeN input 49 of ASIC 10. At the same time, the "Width 16" input line 50 of the ASIC is hard-wired to a "1" (true) value, indicating that the CPU 210 is a 16-bit CPU, and the "DIRECT/INDIRECT" input line 52 of the ASIC is hard-wired to an "INDIRECT" state to indicate that the connected CPU 210 multiplexes addresses and data over a common bus.

Figure 5B:
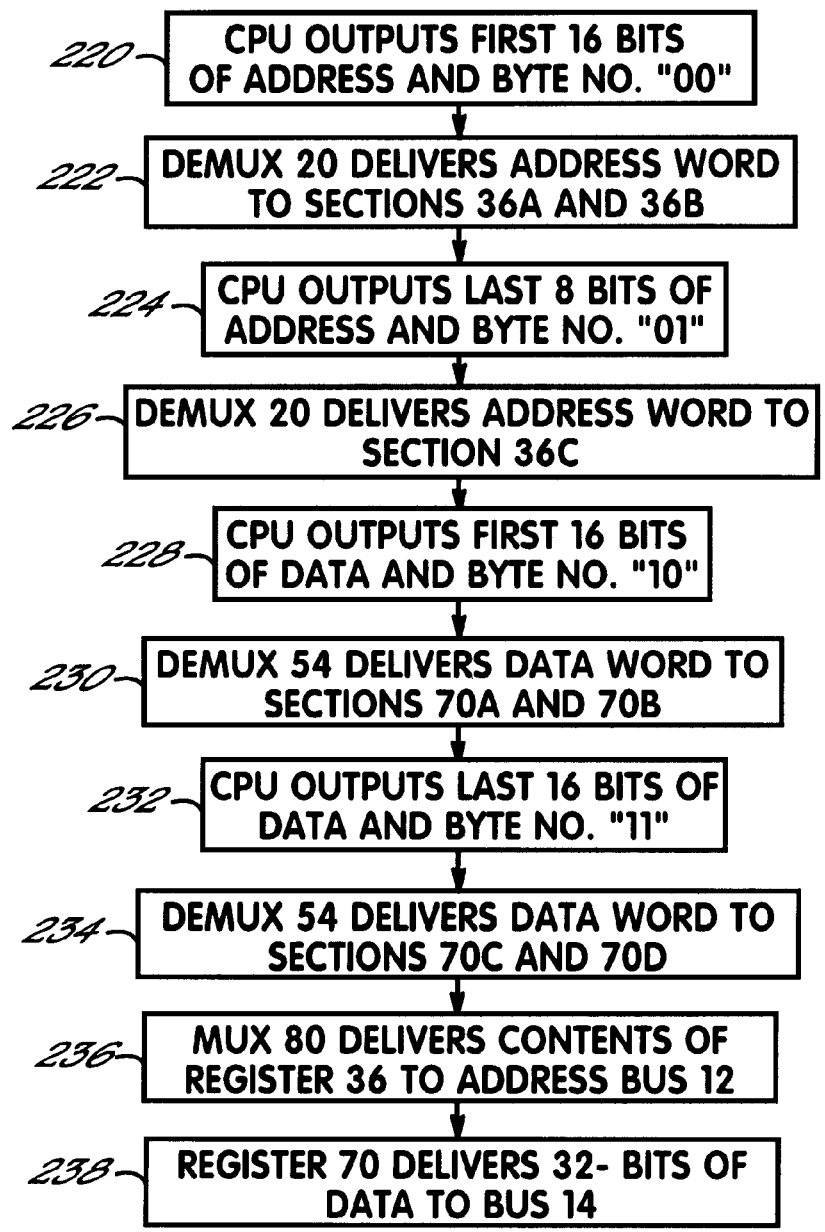
FIG. 5B is a flow chart of operations performed by such a CPU and by the ASIC host interface of FIG. 1 in delivering an address and data to a memory location in the ASIC.

As seen in FIG. 5B, the CPU 210 of FIG. 5A delivers addresses as multiple 8-bit bytes using steps 220 through 226. Specifically, in step 220, CPU 210 outputs the first 16-bits of the address over bus 211, while delivering a "Byte No." signal of "00" over lines 212. Next, in step 224, CPU 210 outputs the remaining 8-bits of the address to the least significant lines of the 16-bit bus 211, while delivering a "Byte No." signal of "01" over lines 212.

As a result of the "indirect" signal on line 52, control logic 48 causes demultiplexer 20 to collect bytes of the address received on bus 17 into address register 36, and also causes multiplexer 80 to deliver the digital signals in the output of address register 36 to the address bus 12 of the ASIC. Specifically, in step 222, control logic 48 responds to the "00" value of the "Byte No." signal on the LSB's of address input bus 18, by causing demultiplexer 20 to deliver the first 16-bits of the address to sections 36a and 36b of address register 36. In step 226, control logic 48 responds to the "01" value of the "Byte No." signal, by causing demultiplexer 20 to deliver the remaining 8-bits of the address from the least significant lines of the ASIC input bus 17 to section 36c of address register 36. At this point, register 36 has been filled with 24-bits of address, and as a consequence the "ADDRESS READY" signal is asserted on line 46. The ASIC can thereafter read the address delivered into register 36 through multiplexer 80.

After delivering an address in the above manner, when writing data to the ASIC, the CPU 210 of FIG. 5A delivers data to the ASIC in 16-bit words. Throughout this process, since data is being written to a location in ASIC 10, the read/writeN signal on lines 213 and 49 has a "0" (write) value, and in response, control logic 48 produces a read/writeN signal on line 69 having a "0" (write) value. Specifically, CPU 210 writes 32-bits of data to the ASIC by sequentially writing two consecutive 16-bit words to the ASIC. In step 228, CPU 160 outputs on bus 211, the first data word, and simultaneously delivers a "Byte No." signal of "10" on lines 212. Next, in step 232, CPU 210 outputs on bus 211, the second 16-bit data word, while simultaneously delivering a "Byte No." signal of "11" on lines 212.

Control logic 48 responds to the "Byte No." signals received from the ASIC address bus 18 to store 16-bit data words received from CPU 210, in the appropriate location in data register 70. In step 230, control logic 48 responds to the "10" value of the "Byte No." signal, to cause the multiplexer/demultiplexer 54 (which is used as a demultiplexer) to deliver the 16-bit data word on bus 17 to sections 70a and 70b of data register 70. Next, in step 234, control logic 48 responds to the "11" value of the "Byte No." signal, to cause the demultiplexer 54 to deliver the 16-bit data word on bus 17 to sections 70c and 70d of data register 70. At this point, a 32-bit word of data has been accumulated in register 70, and as a result, the "DATA READY" signal is asserted on line 76. This causes the ASIC to read the 32-bit data word from register 70 through the data bus 14 (step 238).

Figure 5C:
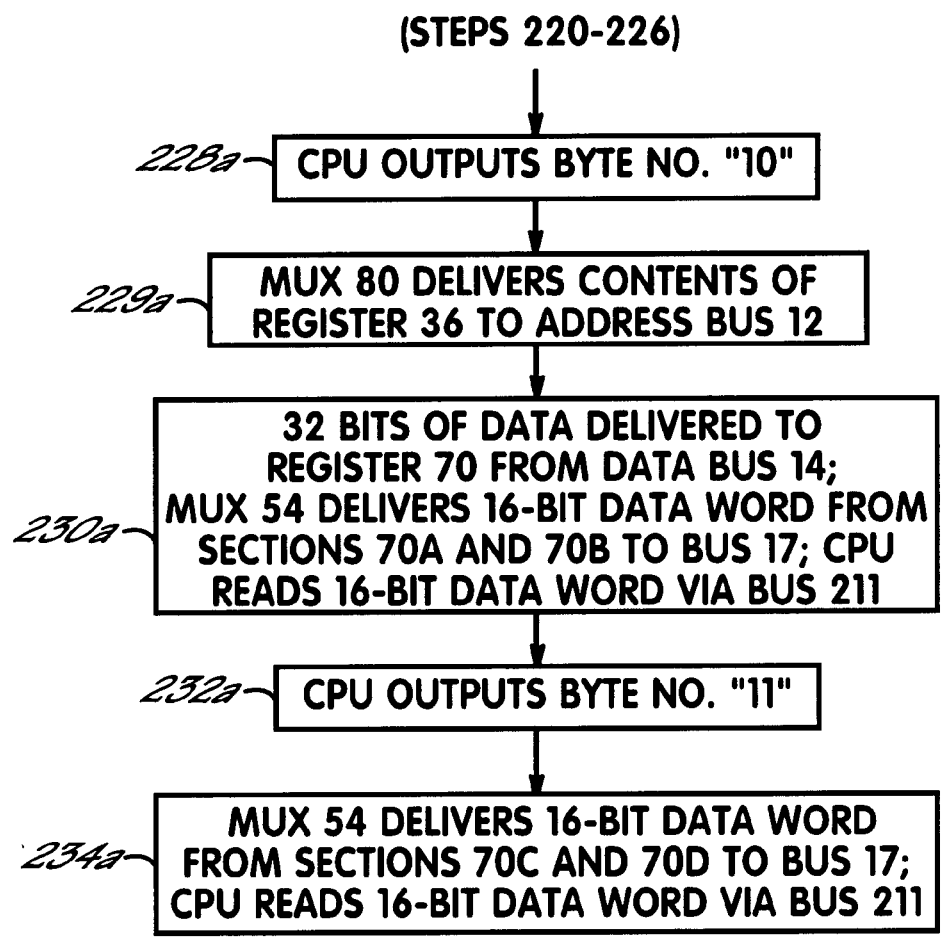
FIG. 5C is a flow chart of operations performed by such a CPU and by the ASIC host interface of FIG. 1 in retrieving data from a memory location in the ASIC.

Referring to FIG. 5C, the CPU 210 of FIG. 5A reads data from the ASIC in 16-bit words. Specifically, CPU 210 reads 32-bits of data to the ASIC by sequentially reading two consecutive 16-bit words from the ASIC. Throughout this process, since data is being read from a location in ASIC 10, the read/writeN signal on lines 213 and 49 has a "1" (read) value, and in response, control logic 48 produces a read/writeN signal on line 69 having a "1" (read) value. To read the bytes in sequence, after delivering the address via steps 220 through 226, in step 228a, CPU 210 delivers a "Byte No." signal of "10" on lines 212. In response, in step 229a, multiplexer 80 delivers the address stored in register 36 to address bus 12. In response, the ASIC reads the addressed location, and in step 230a, delivers 32-bits of data to register 70 via the ASIC data bus 14. In the same step, multiplexer/demultiplexer 54 (which is used as a multiplexer) delivers a 16-bit data word from sections 70a and 70b of register 70 to bus 17. CPU 210 then receives this 16-bit data word via bus 211. Next, in step 232a, CPU 210 delivers a "Byte No." signal of "11" on lines 212. In response, the multiplexer 54 delivers a 16-bit data word from sections 70c and 70d of register 70 to bus 17. CPU 210 then receives this 16-bit data word via bus 211.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An application specific integrated circuit (ASIC) including an interface for connection to a host central processing unit, comprising:

application specific circuitry for performing computations upon instruction from said central processing unit; and an interface for connection to said host central processing unit, comprising
  a CPU data bus for connection to a data bus of said host central processing unit,
  a data width signal line for receiving a data width signal indicative of a width of data used by said central processing unit,
  a data register for storing data delivered to said interface from said CPU data bus or from said ASIC,
  a transfer circuit connected to said CPU data bus and to said data register for transferring digital signals between said CPU data bus and said data register, said transfer circuit having a first mode in which said transfer circuit transfers a first number of digital signals between said CPU data bus and said data register, and a second mode in which said transfer circuit transfers a second different number of digital signals between said CPU data bus and said data register, said transfer circuit responding to a transfer circuit control signal by operating in said first mode or said second mode, and
  control logic connected to said data width signal line and responsive to said data width signal to generate said transfer circuit control signal, said control logic delivering said transfer circuit control signal to said transfer circuit causing said transfer circuit to transfer either said first or said second different number of digital signals between said CPU data bus and said data register, based on a width of data used by said central processing unit as identified by said data width signal.

2. The ASIC of claim 1, wherein said data register includes a first set of locations for storing said first number of digital signals, and a second set of locations for storing said first number of digital signals, and said transfer circuit is responsive to said control logic in said first mode, to transfer said first number of digital signals between said CPU data bus and said first set of locations in said data register, and then transfer said first number of digital signals between said CPU data bus and said second set of locations in said data register.

3. The ASIC of claim 2, wherein said second different number of digital signals is twice said first number of digital signals, and said transfer circuit is responsive to said control logic in said second mode, to transfer said second different number of digital signals between said CPU data bus and said first and second sets of locations simultaneously.

4. The ASIC of claim 2, wherein said data register includes a third set of locations for storing said first number of digital signals, and a fourth set of locations for storing said first number of digital signals, and said transfer circuit is further responsive to said control logic in said first mode, to transfer said first number of digital signals between said CPU data bus and said third set of locations in said data register, and then to transfer said first number of digital signals between said CPU data bus and said fourth set of locations in said data register.

5. The ASIC of claim 2, further comprising an ASIC data bus for transferring data between said data register and other circuitry of said ASIC, wherein said data register is connected to said ASIC data bus, said data register transferring digital signals of said first and second locations to and from said ASIC data bus.

6. The ASIC of claim 1, wherein said first number is eight, and said second different number is sixteen.

7. An application specific integrated circuit (ASIC) including an interface for connection to a host central processing unit, comprising:

application specific circuitry for performing computations upon instruction from said central processing unit; and an interface for connection to said host central processing unit, comprising
  a CPU data bus for connection to a data bus of said host central processing unit,
  an address input bus for connection to an address output bus of said host central processing unit,
  a direct/indirect signal line for receiving a direct/indirect signal indicative of whether a connected host central processing unit has separate address output and data input/output busses or a multiplexed data/address input/output bus, an address register for storing an address received by said interface via said CPU data bus, an ASIC address bus for providing an address received by said interface to said ASIC, and a multiplexer having a first input connected to said address register and a second input connected to said address input bus, an output connected to said ASIC address bus, and a control signal input for receiving a multiplexer control signal derived from said direct/indirect signal, said multiplexer responding to a first state of said multiplexer control signal by delivering digital signals received from said address input bus to said ASIC address bus, and responding to a second state of said multiplexer control signal by delivering digital signals received from said address register to said ASIC address bus.

8. The ASIC of claim 7 wherein said direct/indirect signal line is connected to said control signal input of said multiplexer.

9. The ASIC of claim 7 wherein said interface further comprises:

an address demultiplexer connected to said CPU data bus and to said address register for storing digital signals received on said CPU data bus into said address register, said address demultiplexer having a first mode in which said address demultiplexer stores a first number of digital signals received on said CPU data bus in said address register, and a second mode in which said address demultiplexer stores a second different number of digital signals received on said CPU data bus into said address register, said address demultiplexer responding to an address demultiplexer control signal by operating in said first mode or said second mode, and control logic connected to one or more lines of said address input bus and to said direct/indirect signal line, and responsive to said direct/indirect signal and to a byte number signal received from said lines of said address input bus, to generate said address demultiplexer control signal, said control logic delivering said address demultiplexer control signal to said address demultiplexer causing said address demultiplexer to store either said first or said second different number of digital signals from said CPU data bus into said address register, based on a byte number signal received by said control logic from said lines of said address input bus.

10. The ASIC of claim 7, wherein said address register includes a first set of locations for storing said first number of digital signals, and a second set of locations for storing said first number of digital signals, and said address demultiplexer is responsive to said control logic in said first mode, to store said first number of digital signals from said CPU data bus into said first set of locations in said address register, and then to store said first number of digital signals from said CPU data bus into said second set of locations in said address register.

11. The ASIC of claim 10, wherein said address demultiplexer is responsive to said control logic in said second mode, to store said second different number of digital signals from said CPU data bus into said first and second sets of locations simultaneously.

12. The ASIC of claim 11, wherein said address register includes a third set of locations for storing said first number of digital signals, and said address demultiplexer is further responsive to said control logic in said first mode, to store said first number of digital signals from said CPU data bus into said third set of locations in said address register, and said address demultiplexer is further responsive to said control logic in said second mode, to store said first number of digital signals from said CPU data bus into said third set of locations in said address register.

13. The ASIC of claim 12 wherein said first number is eight and said second different number is sixteen.

14. The ASIC of claim 7, wherein said interface further comprises:

a data width signal line for receiving a data width signal indicative of a width of data used by said central processing unit, a data register for storing data transferred between said interface and a data bus of said host central processing unit, a transfer circuit connected to said CPU data bus and to said data register for transferring digital signals between said CPU data bus and said data register, said transfer circuit having a first mode in which said transfer circuit transfers a first number of digital signals between said CPU data bus and said data register, and a second mode in which said transfer circuit transfers a second different number of digital signals between said CPU data bus and said data register, said transfer circuit responding to a transfer circuit control signal by operating in said first mode or said second mode, and control logic connected to said data width signal line and responsive to said data width signal to generate said transfer circuit control signal, said control logic delivering a control signal to said transfer circuit causing said transfer circuit to transfer either said first or said second different number of digital signals between said CPU data bus and said data register, based on a width of data used by said central processing unit as identified by said data width signal.

15. The ASIC of claim 14, wherein said data register includes a first set of locations for storing said first number of digital signals, and a second set of locations for storing said first number of digital signals, and said transfer circuit is responsive to said control logic in said first mode, to transfer said first number of digital signals between said CPU data bus and said first set of locations in said data register, and then to transfer said first number of digital signals between said CPU data bus and said second set of locations in said data register.

16. The ASIC of claim 15, wherein said second different number of digital signals is twice said first number of digital signals, and said transfer circuit is responsive to said control logic in said second mode, to transfer said second different number of digital signals between said CPU data bus and said first and second sets of locations simultaneously.

17. The ASIC of claim 15, wherein said data register includes a third set of locations for storing said first number of digital signals, and a fourth set of locations for storing said first number of digital signals, and said transfer circuit is further responsive to said control logic in said first mode, to transfer said first number of digital signals between said CPU data bus and said third set of locations in said data register, and then to transfer said first number of digital signals between said CPU data bus and said fourth set of locations in said data register.

18. The ASIC of claim 15, further comprising a ASIC data bus for providing received data to said ASIC, wherein said data register is connected to said ASIC data bus, said data register transferring digital signals stored in said first and second locations to or from said ASIC data bus.

19. The ASIC of claim 14, wherein said first number is eight, and said second different number is sixteen.

* * * * *

UNITED STATES PATENT AND TRADEMARK OFFICE
CERTIFICATE OF CORRECTION

PATENT NO. : 5,916,312

DATED : June 29, 1999

INVENTOR(S) : Quang C. Phung and Moshe Bublil

It is certified that error appears in the above-identified patent and that said Letters Patent is hereby corrected as shown below:

Column 7, line 52 reads "delivers 325 bits" and should read --delivers 32-bits--.

Column 8, line 51 reads "having least significant bits of "0" and should read --having least significant bits of "0x"--.

Signed and Sealed this

Seventh Day of March, 2000

Attest:

Q. TODD DICKINSON

Attesting Officer

Commissioner of Patents and Trademarks